US012279356B2

(12) United States Patent
Park et al.

(10) Patent No.: US 12,279,356 B2
(45) Date of Patent: Apr. 15, 2025

(54) ELECTRIC RANGE

(71) Applicant: LG ELECTRONICS INC., Seoul (KR)

(72) Inventors: Jinwoo Park, Seoul (KR); Jungmin Cha, Seoul (KR); Jaeho Lee, Seoul (KR); Il Young Park, Seoul (KR); Seunghak Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 196 days.

(21) Appl. No.: 17/193,070

(22) Filed: Mar. 5, 2021

(65) Prior Publication Data

US 2021/0289591 A1 Sep. 16, 2021

(30) Foreign Application Priority Data

Mar. 12, 2020 (KR) ........................ 10-2020-0030919

(51) Int. Cl.
*H05B 6/12* (2006.01)
*H05B 6/04* (2006.01)

(52) U.S. Cl.
CPC ............. *H05B 6/1236* (2013.01); *H05B 6/04* (2013.01); *H05B 6/1263* (2013.01)

(58) Field of Classification Search
CPC ....... H05B 6/04; H05B 6/1236; H05B 6/1263
See application file for complete search history.

(56) References Cited

U.S. PATENT DOCUMENTS

| | | | | |
|---|---|---|---|---|
| 8,993,941 B2 * | 3/2015 | Kataoka | H05B 6/1263 219/677 |
| 2008/0185376 A1 * | 8/2008 | Gagas | H05B 6/1263 219/623 |
| 2016/0150597 A1 * | 5/2016 | Yun | H05B 6/1272 219/662 |
| 2017/0019959 A1 * | 1/2017 | Park | H05B 6/1209 |
| 2020/0053838 A1 | 2/2020 | Kim et al. | |
| 2021/0345459 A1 * | 11/2021 | Yun | H02M 7/48 |

FOREIGN PATENT DOCUMENTS

| | | | |
|---|---|---|---|
| DE | 10 2006 030547 | 1/2008 | |
| FR | 3000177 A1 * | 6/2014 | F24C 7/082 |
| JP | 2006086059 A * | 3/2006 | |
| JP | 2007-294474 | 11/2007 | |
| JP | 2010140657 A * | 6/2010 | |
| KR | 20180025010 A * | 3/2018 | |
| KR | 10-2018-0072628 | 6/2018 | |

(Continued)

OTHER PUBLICATIONS

Machine translation of JP-2010140657: Hirade, Induction Heating Appliance for Cooking, 2010 (Year: 2010).*

(Continued)

*Primary Examiner* — Brian W Jennison
*Assistant Examiner* — Abigail H Rhue
(74) *Attorney, Agent, or Firm* — KED & ASSOCIATES, LLP

(57) ABSTRACT

An electric range is provided, in which filter circuits are disposed at an edge of a lower end of a case and are spaced a maximum distance apart from a plurality of working coils, thereby reducing noise generated by the working coils as much as possible and improving performance of the filter circuits.

6 Claims, 8 Drawing Sheets

(56) References Cited

FOREIGN PATENT DOCUMENTS

| | | | |
|---|---|---|---|
| KR | 10-2019-0111660 | | 10/2019 |
| WO | WO-2016082662 | A1 * | 6/2016 |

OTHER PUBLICATIONS

Machine translation of WO-2016082662: Li, A filter circuit and device, 2016 (Year: 2016).*
Machine translation of JP-2006086059: "Yasuda, Induction Heating Cooker, 2006" (Year: 2006).*
Machine translation of FR-3000177: "Belache, Cook top i.e. induction cook top, has cooling fan generating cooling air flow circulating along heat sink, and air guide channeling flow from fan to heat sink and recovering single portion of heat sink according to longitudinal direction, 2014" (Year: 2014) (Year: 2014).*
Machine translation of KR-20180025010: "Ha, A combination cooker including induction heater, 2018" (Year: 2018).*
European Search Report issued in Application No. 21162097.6 dated Jul. 26, 2021.
European Office Action dated May 28, 2024 issued in Application No. 21162097.6.

* cited by examiner

ELECTRIC RANGE

CROSS-REFERENCE TO RELATED APPLICATION(S)

This application claims priority to and the benefit of Korean Patent Application No. 10-2020-0030919, filed in Korea on Mar. 12, 2020, the disclosure of which is incorporated herein by reference in its entirety.

BACKGROUND

1. Field

An electric range is disclosed herein.

2. Background

Various types of cooking appliances are used to heat food or other items (hereinafter, collectively "food") at homes or restaurants. The cooking appliances include gas ranges using gas and electric ranges using electricity.

The electric ranges are classified as resistance heating-type electric ranges and induction heating-type electric ranges. In a resistance heating method, electric current is supplied to a metallic resistance wire or a non-metallic heat generation element, such as silicon carbide to generate heat, and the generated heat is radiated or conducted to heat an object to be heated, for example, a cooking vessel, such as a pot, or a frying pan, for example. In an induction heating method, high-frequency power is supplied to a coil to generate a magnetic field around the coil, and eddy current produced in the generated magnetic field is used to heat an object to be heated made of a metallic material.

Regarding basic theories of induction heating, when electric current is supplied to a working coil or a heating coil, heat is generated while an object to be heated is inductively heated, and the object to be heated is heated by the generated heat.

A magnetic field generated as a result of driving of the working coil affects other electronic devices. For example, a screen of a TV in a living room can flicker due to a magnetic field of an induction heating device in the kitchen.

To solve the problem, the induction heating device is provided with a filter circuit. The filter circuit can reduce noise that affects another electronic device.

FIG. 1 is a view of a related art induction heating device. FIG. 1 is disclosed in Korean Patent Publication No. 10-2019-0111660, which is hereby incorporated by reference.

Referring to FIG. 1, a filter circuit includes a plurality of filters, and is disposed at a center of a case 10'. That is, the filter circuit is disposed right below a working coil 60. Accordingly, noise generated by the working coil 60 affects the filter circuit due to the position of the filter circuit.

Additionally, when a temperature of the filter circuit itself increases, a noise reduction effect decreases. More particularly, when the filter circuit is disposed below a high-power working coil 60, the temperature of the filter circuit itself further increases, and the filter circuit cannot perform the function of noise filtering properly due to the increase in temperature.

BRIEF DESCRIPTION OF THE DRAWINGS

Embodiments will be described in detail with reference to the following drawings in which like reference numerals refer to like elements, and wherein.

DETAILED DESCRIPTION

Figure 1:
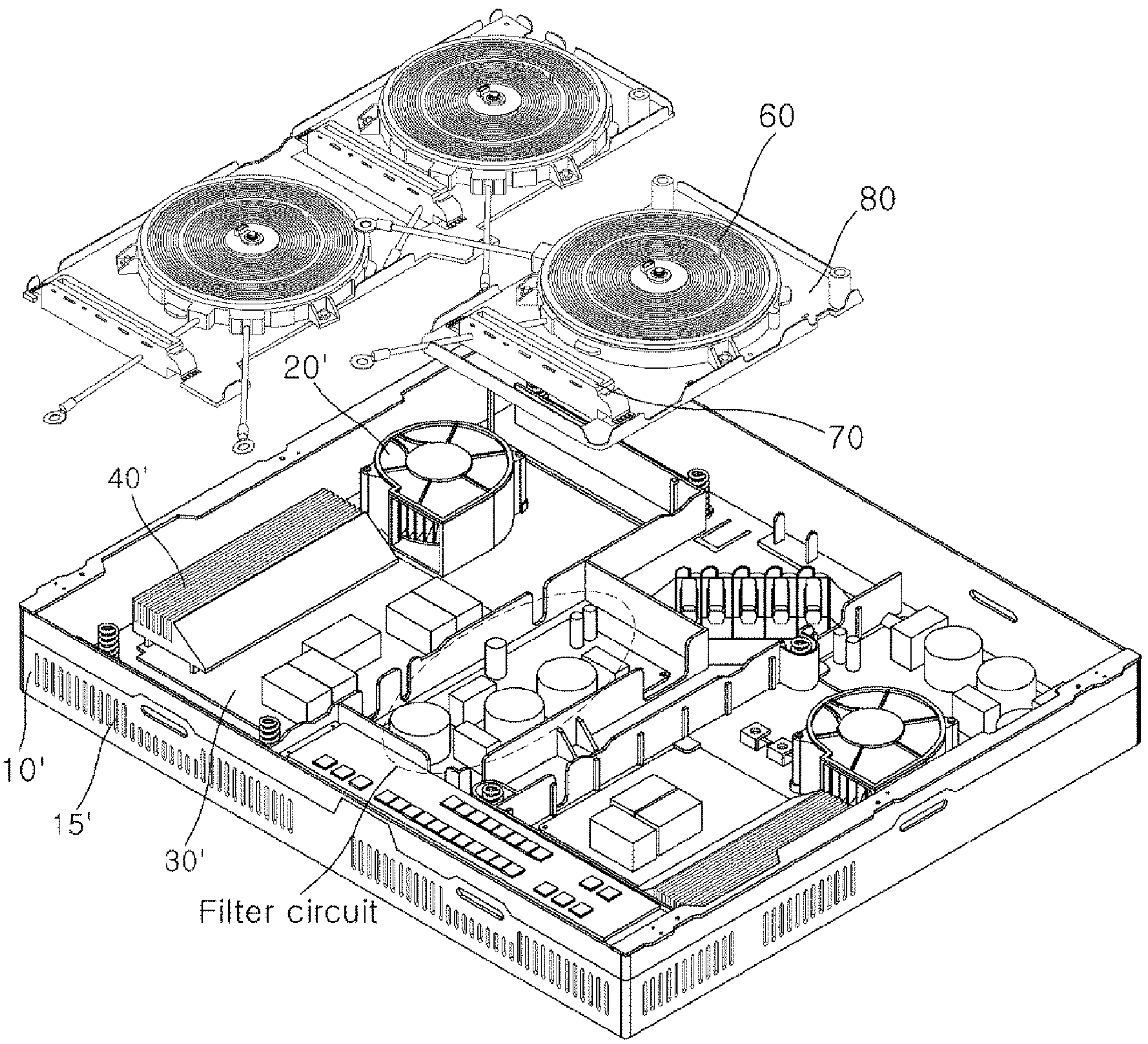
FIG. 1 RELATED ART
FIG. 1 is a view of a related art induction heating device.

Embodiments are described hereinafter with reference to the accompanying drawings such that one having ordinary skill in the art to which the embodiments pertain may easily implement the technical idea. In the disclosure, description of known technologies in relation to the disclosure is omitted if it is deemed to make the gist unnecessarily vague. In the drawings, the same or like reference numerals denote the same or like components.

The terms "first", "second" and the like are used herein only to distinguish one component from another component. Thus, the components should not be limited by the terms. Certainly, a first component can be a second component unless stated to the contrary.

When one component is described as being "in an upper portion (or a lower portion)" of another component, or "on (or under)" another component, one component can be placed on the upper surface (or under the lower surface) of another component, and an additional component may be interposed between another component and one component on (or under) another component.

When one component is described as being "connected", "coupled", or "connected" to another component, one component can be directly connected, coupled or connected to another component; however, it is also to be understood that an additional component can be "interposed" between the two components, or the two components can be "connected", "coupled", or "connected" through an additional component.

Hereinafter, each component may be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "have," set forth herein, are not interpreted as necessarily including all the stated components or steps but can be interpreted as including some of the stated components or steps or can be interpreted as further including additional components or steps.

Hereinafter, the terms "A and/or B" as used herein can denote A, B or A and B, and the terms "C to D" can denote C or greater and D or less, unless stated to the contrary.

Hereinafter, an electric range is described with reference to several embodiments. The electric range disclosed herein may include an electric resistance-type electric range and an induction heating-type electric range, for example, an induction heating device. For convenience, an induction heating device, provided with a working coil as a heating unit, is described as an example during description of the embodiments. However, embodiments are not limited to those set forth herein.

Figure 2:
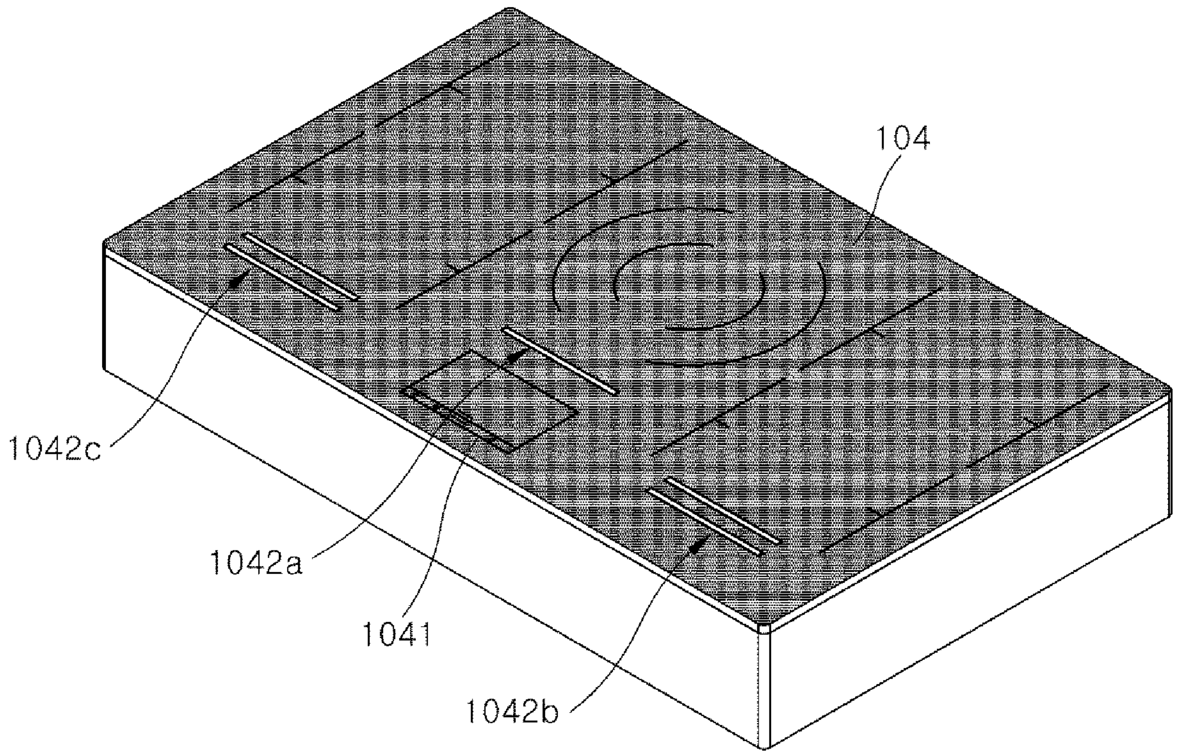
FIG. 2 is a perspective view showing an induction heating device according to an embodiment.
Figure 3:
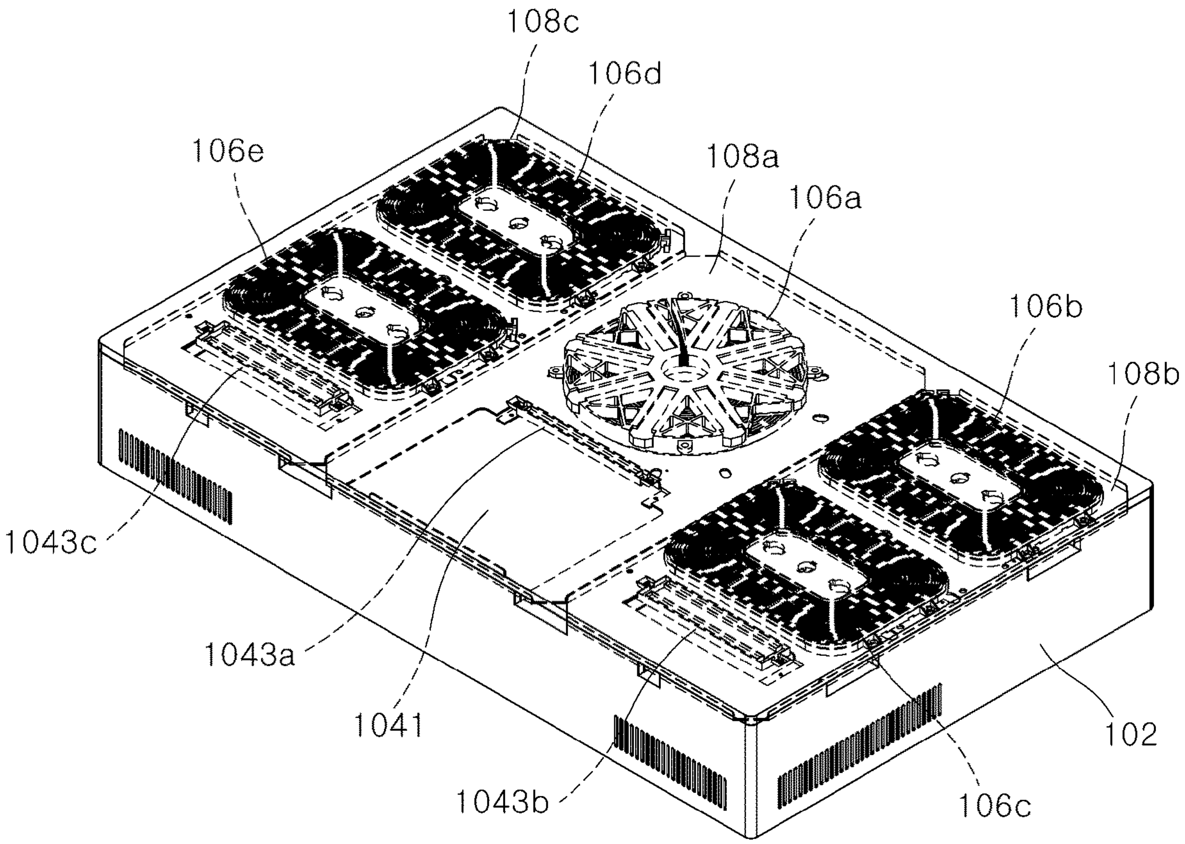
FIGS. 3 to 6 are perspective views showing the induction heating device in FIG. 2 without some components.
Figure 4:
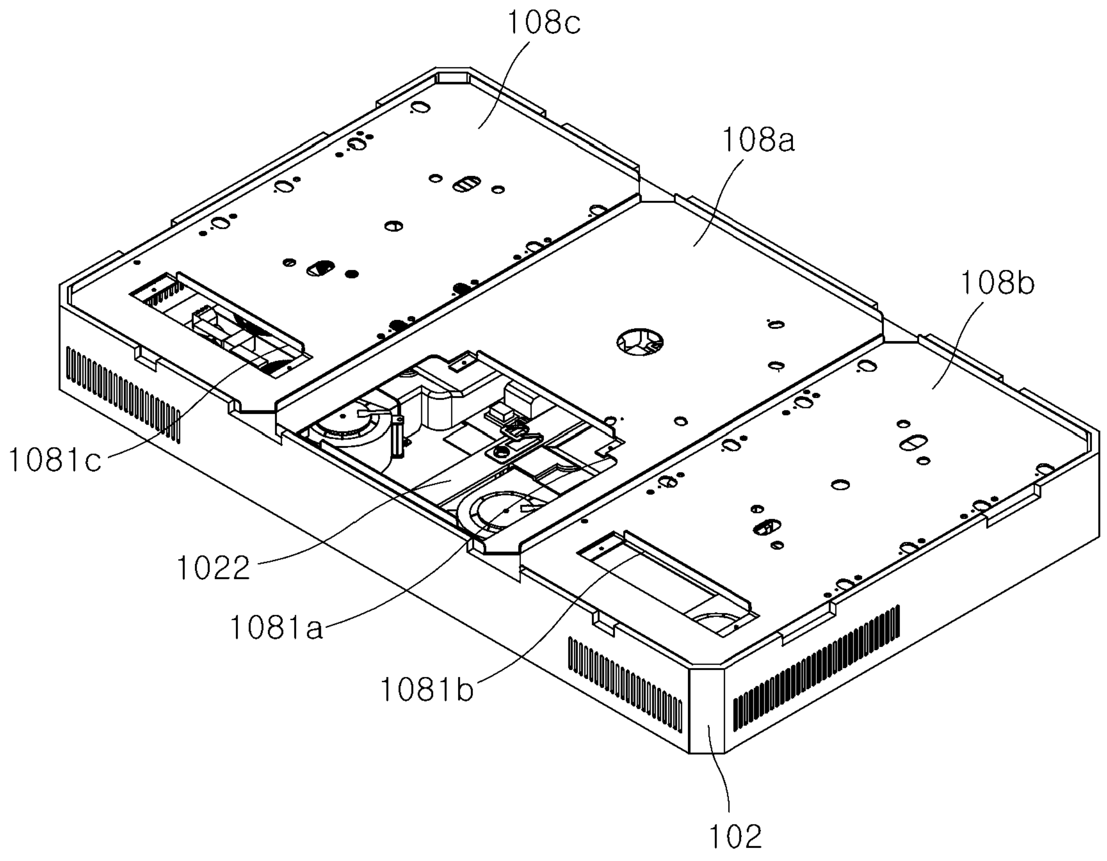
Figure 5:
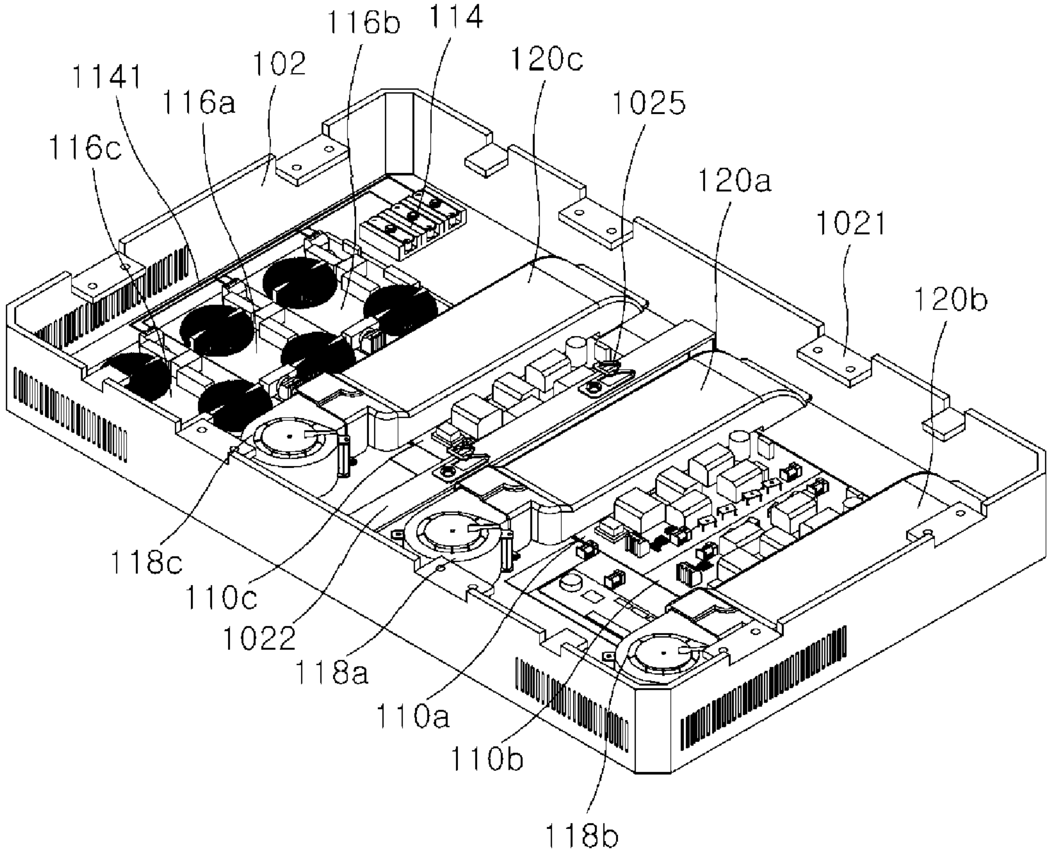
Figure 6:
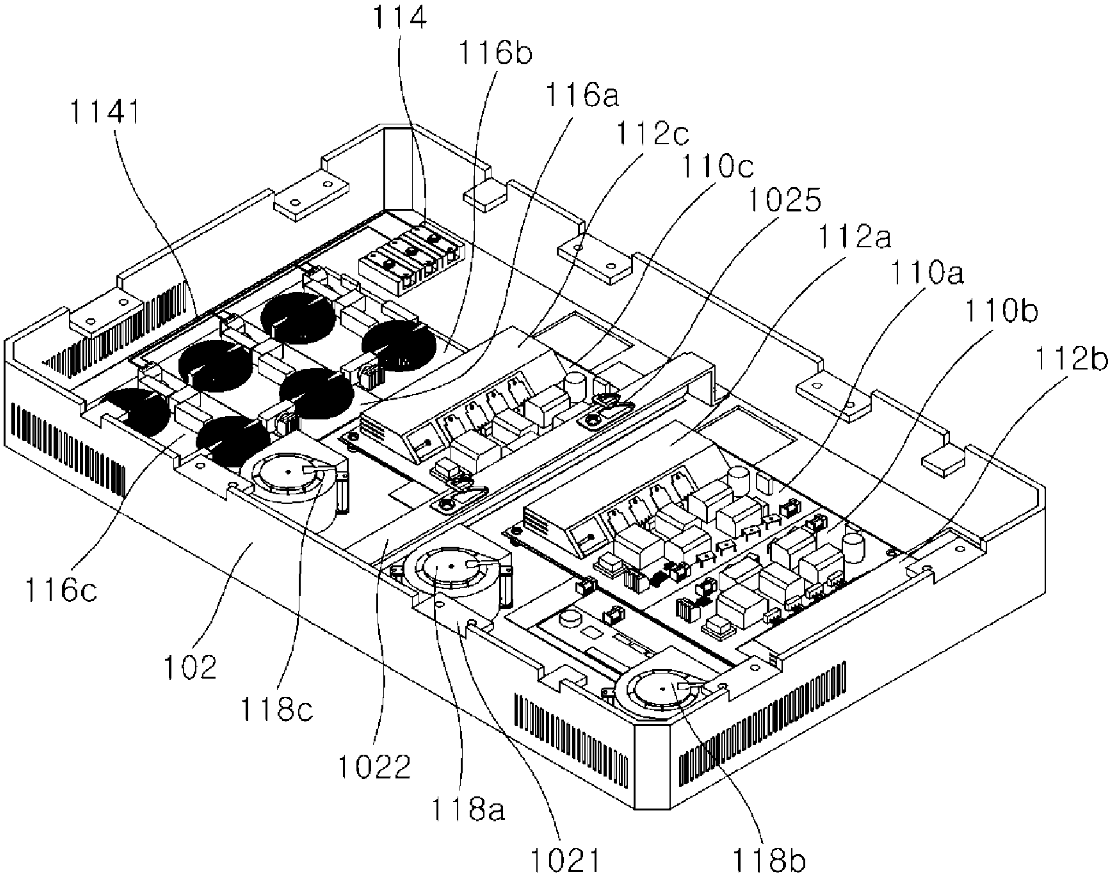

FIG. 2 is a perspective view of an induction heating device 100 according to an embodiment. FIGS. 3 to 6 are perspective views of the induction heating device 100 of FIG. 1 without some components. More specifically, FIG. 3 is a view showing the induction heating device 100 in FIG. 2 without a cover plate 104, FIG. 4 is a view showing the induction heating device 100 in FIG. 2 without the cover plate 104 and working coil 106*a*, 106*b*, 106*c*, 106*d*, 106*e*, FIG. 5 is a view showing the induction heating device 100 in FIG. 2 without the cover plate 104, the working coil 106*a*, 106*b*, 106*c*, 106*d*, 106*e*, and base plate 108*a*, 108*b*, 108*c*, and FIG. 6 is a view showing the induction heating device 100 in FIG. 2 without the cover plate 104, working coil 106*a*, 106*b*, 106*c*, 106*d*, 106*e*, the base plate 108*a*, 108*b*, 108*c*, and an air guide 120*a*, 120*b*, 120*c*.

Referring to FIGS. 2 to 6, the induction heating device 100 according to an embodiment may include a case 102, cover plate 104, one or more working coil 106*a*, 106*b*, 106*c*, 106*d*, 106*e*, one or more base plate 108*a*, 108*b*, 108*c*, one or more drive circuit 110*a*, 110*b*, 110*c*, one or more heat sink 112*a*, 112*b*, 112*c*, a power feeder 114, one or more filter circuit 116*a*, 116*b*, 116*c*, one or more air blowing fan (fan) 118*a*, 118*b*, 118*c*, and one or more air guide 120*a*, 120*b*, 120*c*. The case 102 may protect components in the induction heating device 100. For example, the case 102 may be made of aluminum; however, embodiments are not limited thereto. The case 102 may be thermally insulated to prevent heat, generated by the one or more working coil 106*a*, 106*b*, 106*c*, 106*d*, 106*e*, from leaking outward.

The cover plate 104 may be coupled to an upper end of the case 102 to shield an inside of the case 102, and an object to be heated (not illustrated, an object to be heated by at least one of the one or more working coils 106*a*, 106*b*, 106*c*, 106*d*, 106*e*) may be placed on an upper surface of the cover plate 104.

An object to be heated, such as a cooking vessel, may be placed on the upper surface of the cover plate 104, and heat generated by the one or more working coil 106*a*, 106*b*, 106*c*, 106*d*, 106*e* may be delivered to the object to be heated through the upper surface of the cover plate 104. The cover plate 104 may be made of glass; however, embodiments are not limited thereto.

An input interface 1041 configured to receive an input from a user may be disposed on the upper surface of the cover plate 104. The input interface 1041 may be recessed into the upper surface of the cover plate 104 and may display a specific image. The input interface 1041 may receive a touch input from the user, and the induction heating device 100 may be driven based on the received touch input. One or more parts or portions of the input interface 1041, for example, a control button or knob might also located the case 102 and only the display portion might be located on the cover plate.

More specifically, the input interface 1041 may be a module for controlling and/or inputting a heating intensity and/or a heating period, for example, desired by the user. It may be implemented as a physical button and/or a touch panel, for example.

Additionally, the input interface 1041 may display a drive state of the induction heating device 100 or any other suitable information for operating the electric range. For example, the input interface 1041 may be a display, for example, a liquid crystal display (LCD) or an LED display; however, embodiments are not limited thereto.

One or more light display areas 1042*a*, 1042*b*, 1042*c* may be formed on the upper surface of the cover plate 104. One or more light source units (lighting units) 1043*a*, 1043*b*, 1043*c* may be disposed below the cover plate 104, and light emitted from the one or more light source units 1043*a*, 1043*b*, 1043*c* may be delivered to the user through the one or more light display areas 1042*a*, 1042*b*, 1042*c*.

The one or more working coil 106*a*, 106*b*, 106*c*, 106*d*, 106*e* may be considered as a heating unit that heats an object to the heated, and may be disposed in the case 102. Each of the one or more working coils 106*a*, 106*b*, 106*c*, 106*d*, 106*e* may include a wire wound multiple times in a ring shape, and may generate an alternating current (AC) magnetic field. Additionally, a mica sheet and/or a ferrite core may be consecutively disposed on a lower side of the working coil 106*a*, 106*b*, 106*c*, 106*d*, 106*e*.

The ferrite core may be fixed to the mica sheet via a sealant, and may diffuse the AC magnetic field generated by the one or more working coil 106*a*, 106*b*, 106*c*, 106*d*, 106*e*. The mica sheet may be fixed to the one or more working coil 106*a*, 106*b*, 106*c*, 106*d*, 106*e* and/or the ferrite core through a sealant, and may prevent direct delivery of the heat, generated by the one or more working coil 106*a*, 106*b*, 106*c*, 106*d*, 106*e*, to the ferrite core.

A plurality of working coils 106*a*, 106*b*, 106*c*, 106*d*, 106*e* may be provided. The plurality of working coils 106*a*, 106*b*, 106*c*, 106*d*, 106*e* may include first working coil 106*a* disposed in a central portion of the case 102. One or more low power working coils might be located around the central portion. Second working coil 106*b* and third working coil 106*c* may be disposed on a right (first) side of the first working coil 106*a*. Fourth working coil 106*d* and fifth working coil 106*e* may be disposed on a left (second) side of the first working coil 106*a*.

The second working coil 106*b* and the third working coil 106*c* may be disposed on the right side of the first working coil 106*a* in a forward-backward direction. The fourth working coil 106*d* and the fifth working coil 106*e* may be disposed on the left side of the first working coil 106*a* in the forward-backward direction.

The low power working coils may have different sizes and/or different forms. For example, oval forms for the working coils are possible.

The first working coil 106*a* may be a high-power working coil, and the second working coil 106*b*, the third working coil 106*c*, the fourth working coil 106*d*, and the fifth working coil 106*e* may be low-power working coils. For example, the first working coil 106*a* may be a dual high-power working coil, and the second working coil 106*b*, the third working coil 106*c*, the fourth working coil 106*d*, and the fifth working coil 106*e* may be single low-power working coils. The first working coil 106*a* may have a heavy weight, and may have a maximum output of 7000 Kw. The high output and the low output may be defined based on a predetermined reference output.

The induction heating device 100 according to an embodiment may perform the function of wireless power transmission based on configurations and features described above.

Technologies for wirelessly supplying power have been developed and have been used for a wide range of electronic devices. A battery of an electronic device, to which the wireless power transmitting technology is applied, can be charged only by being placed on a charge pad without connecting to an additional charge connector. Accordingly, the electronic device, to which the wireless power transmitting technology is applied, requires no cord or no charger, thereby ensuring improved mobility and a reduced size and weight.

The wireless power transmitting technology can be broadly classified as an electromagnetic induction technology using a coil, a resonance technology using resonance, and a radio emission technology for converting electric energy into microwaves and delivering the microwaves, for example. In the electromagnetic induction technology, power is transmitted using electromagnetic induction between a primary coil, that is, a working coil. included in an apparatus for wirelessly transmitting power and a secondary coil included in an apparatus for wirelessly receiving power.

The theory of the induction heating technology of the induction heating device 100 is substantially the same as that of the electromagnetic induction-based wireless power transmission technology, in that an object to be heated is heated using electromagnetic induction. Accordingly, the induction heating device 100 according to an embodiment may perform the function of wireless power transmission, as well as the function of induction heating.

The one or more base plate 108*a*, 108*b*, 108*c* may be disposed at an end of the case 102, and the plurality of working coils 106*a*, 106*b*, 106*c*, 106*d*, 106*e* may be disposed in an upper portion of the one or more base plate 108*a*, 108*b*, 108*c*. The one or more base plate 108*a*, 108*b*, 108*c* may support the plurality of working coils 106*a*, 106*b*, 106*c*, 106*d*, 106*e* which are heavy, and may help the plurality of working coils 106*a*, 106*b*, 106*c*, 106*d*, 106*e* to be mounted. The input interface 1041 and the light source unit 1043 may be further disposed at the upper portion of the base plate 108*a*, 108*b*, 108*c*.

A plurality of base plates 108*a*, 108*b*, 108*c* may be provided; however, embodiments are not limited thereto. Alternatively, a single base plate may be disposed in the case 102.

The plurality of base plates 108*a*, 108*b*, 108*c* may include first base plate 108*a*, second base plate 108*b*, and third base plate 108*c*. The first base plate 108*a*, the second base plate 108*b*, and the third base plate 108*c* may be disposed at the middle of the case 102 side by side with each other.

The first base plate 108*a* may be disposed at a central portion of the end of the case 102. The first working coil 106*a* may be disposed at an upper portion of the first base plate 108*a*.

The input interface 1041, and first light source unit 1043*a* corresponding to the first working coil 106*a* may be further disposed in the upper portion of the first base plate 108*a*. The first base plate 108*a* may have a through hole 1081*a* for installing the input interface 1041 and the first light source unit 1043*a*.

The second base plate 108*b* may be disposed on a right (first) side of the first base plate 108*a* at the end of the case 102. The second working coil 106*b* and the third working coil 106*c* may be disposed at an upper portion of the second base plate 108*b*.

A second light source unit 1043*b* corresponding to the second working coil 106*b* and the third working coil 106*c* may be further disposed in the upper portion of the second base plate 108*b*. In the upper portion of the second base plate 108*b*, the second working coil 106*b*, the third working coil 106*c*, and the second light source unit 1043*b* may be consecutively disposed. The second base plate 108*b* may have a through hole 1081*b* for installing the second light source unit 1043*b*.

The third base plate 108*c* may be disposed on a left (second) side of the first base plate 108*a* at the end of the case 102. The fourth working coil 106*d* and the fifth working coil 106*e* may be disposed at an upper portion of the third base plate 108*c*.

A third light source unit 1043*c* corresponding to the fourth working coil 106*d* and the fifth working coil 106*e* may be further disposed at the upper portion of the third base plate 108*c*. In the upper portion of the third base plate 108*c*, the fourth working coil 106*d*, the fifth working coil 106*e*, and the third light source unit 1043*c* may be consecutively disposed. The third base plate 108*c* may have a through hole 1081*c* for installing the third light source unit 1043*c*.

The case 102 may have a plurality of mounting portions 1021 to mount the plurality of base plates 108*a*, 108*b*, 108*c* at an outer circumferential surface of the case 102. That is, edges of the plurality of base plates 108*a*, 108*b*, 108*c* may be mounted onto a top of the plurality of mounting portions 1021. Accordingly, the plurality of base plates 108*a*, 108*b*, 108*c* may be disposed at the end of the case 102. The mounting portions 1021 may be a bent portion of the case bent inside of the case to thereby provide a supporting surface for the one or more base plates.

The one or more filter circuits 116*a*, 116*b*, 116*c*, the one or more drive circuit 110*a*, 110*b*, 110*c*, and the one or more air blowing fans 118*a*, 118*b*, 118*c* may be located below the one or more base plates 108*a*, 108*b*, 108*c* inside of the case 102.

The case 102 may include a bracket 1022 at a central portion of a lower end or surface of the case 102. The bracket 1022 may be disposed at a central portion of a lower side of the first base plate 108*a*, and may prevent sagging of a lower surface of the first base plate 108*a*, caused by a weight of the first base plate 108*a*. The weight of the first base plate 108*a* may include a weight of the first working coil 106*a* located at the upper portion of the first base plate 108*a*.

The bracket 1022 may include at least one elastic element 1025 on a top of the bracket 1022. For example, the elastic element 1025 may be a leaf spring. An upper end of at least one elastic element 1025 may contact the lower surface of the first base plate 108*a*, and may prevent sagging of the lower surface of the first base plate 108*a*.

The one or more drive circuits 110*a*, 110*b*, 110*c* may control driving of the one or more working coils 106*a*, 106*b*, 106*c*, 106*d*, 106*e* which are heating units, and may further control driving of components, such as an input interface 1041, for example, of the induction heating device 100.

The drive circuits 110*a*, 110*b*, 110*c* may control driving of the plurality of working coils 106*a*, 106*b*, 106*c*, 106*d*, 106*e*, which are heating units, and may further control driving of components, such as an input interface 1041, for example, of the induction heating device 100. The drive circuits 110*a*, 110*b*, 110*c* may include various components in relation to the driving of the working coils 106*a*, 106*b*, 106*c*, 106*d*, 106*e*. The components may include a power supply configured to supply AC power, a rectifier configured to rectify AC power of the power supply into direct current (DC) power, an inverter configured to convert DC power, rectified by the rectifier, into resonance current as a result of a switching operation and supply the resonance current to the working coil 106, a microcomputer, for example, a micom, configured to control the inverter and components in relation to driving of the inverter, and a relay or a semiconductor switch configured to turn on or turn off the working coils 106*a*, 106*b*, 106*c*, 106*d*, 106*e*, for example.

The drive circuits 110*a*, 110*b*, 110*c* may control driving of the plurality of working coils 106*a*, 106*b*, 106*c*, 106*d*, 106*e* which are heating units, and may further control driving of components, such as an input interface 1041, for example, of the induction heating device 100. The drive circuits 110*a*, 110*b*, 110*c* may include various components in relation to the driving of the working coils 106*a*, 106*b*, 106*c*, 106*d*, 106*e*. The components may include a power supply configured to supply AC power, a rectifier configured to rectify AC power of the power supply into direct current (DC) power, an inverter configured to convert DC power, rectified by the rectifier, into resonance current as a result of a switching operation and supply the resonance current to the working coil 106, a microcomputer, for example, a micom, configured to control the inverter and components in relation to driving of the inverter, and a relay or a semiconductor switch configured to turn on or turn off the working coils 106*a*, 106*b*, 106*c*, 106*d*, 106*e*, for example.

The one or more heat sink 112*a*, 112*b*, 112*c* may be disposed over portions of the drive circuits 110*a*, 110*b*, 110*c* and may prevent an increase in temperature of components disposed at the portions of the drive circuits 110*a*, 110*b*, 110*c*.

The one or more heat sink 112*a*, 112*b*, 112*c* may be disposed in or at upper portions of the drive circuits 110*a*, 110*b*, 110*c* and may prevent an increase in temperature of components disposed at the drive circuits 110*a*, 110*b*, 110*c*. The one or more heat sink 112*a*, 112*b*, 112*c* may include first heat sink 112*a*, second heat sink 112*b*, and third heat sink 112*c*. The first heat sink 112*a* may prevent an increase in temperature of components installed at the first drive circuit 110*a*, the second heat sink 112*b* may prevent an increase in temperature of components installed at the second drive circuit 110*b*, and the third heat sink 112*c* may prevent an increase in temperatures of components installed at the third drive circuit 110*c*.

The power feeder 114 may supply an external power source to the induction heating device 100. The power feeder 114 may be implemented as a terminal block, for example.

The power feeder 114 may be disposed at any one of edges of the lower end of the case 102. For example, the power feeder 114 may be disposed at an upper end of the left side of the lower end of the case 102.

The one or more filter circuit 116*a*, 116*b*, 116*c* may be disposed at any one of the edges of the lower end of the case 102, and may reduce noise made by the plurality of working coils 106*a*, 106*b*, 106*c*, 106*d*, 106*e*. The one or more filter circuit 116*a*, 116*b*, 116*c* may include first filter circuit 116*a*, second filter circuit 116*b*, and third filter circuit 116*c*.

The first filter circuit 116*a* may reduce noise made by the first working coil 106*a*. The second filter circuit 116*b* may reduce noise made by the second working coil 106*b* and the third working coil 106*c*. The third filter circuit 116*c* may reduce noise made by the fourth working coil 106*d* and the fifth working coil 106*e*.

The one or more air blowing fans 118*a*, 118*b*, 118*c* may reduce a temperature inside of the case 102. Accordingly, the one or more air blowing fan 118*a*, 118*b*, 118*c* may lower a temperature of various components installed in or on the drive circuits 110*a*, 110*b*, 110*c*.

The one or more air blowing fan 118*a*, 118*b*, 118*c* may include first air blowing fan 118*a*, second air blowing fan 118*b*, and third blow fan 118*c*. The first air blowing fan 118*a* may cool various components installed in or on the first drive circuit 110*a* and may further cool the first light source unit 1043*a* and the input interface 1041. More particularly, the first air blowing fan 118*a* may deliver air (wind) for cooking to the first heat sink 112*a* in or at an upper portion of the first drive circuit 110*a*.

The second air blowing fan 118*b* may cool various components installed in or on the second drive circuit 110*b* and may further cool the second light source unit 1043*b*. More particularly, the second air blowing fan 118*b* may deliver air for cooling to the second heat sink 112*b* in or at an upper portion of the second drive circuit 110*b*.

The third air blowing fan 118*c* may cool various components installed in or on the third drive circuit 110*c* and may further cool the third light source unit 1043*c*. More particularly, the third air blowing fan 118*c* may deliver air for cooling to the third heat sink 112*c* in or at an upper portion of the third drive circuit 110*c*.

The air guide 120*a*, 120*b*, 120*c* may guide air generated by the air blowing fans 118*a*, 118*b*, 118*c*. The air guide 120*a*, 120*b*, 120*c* may include first air guide 120*a*, second air guide 120*b*, and third guide 120*c*.

The first air guide 120*a* may be disposed to encircle the first heat sink 112*a* installed at the first drive circuit 110*a* and may guide (deliver) air, output from the first air blowing fan 118*a*, to the first heat sink 112*a*. The second air guide 120*b* may be disposed to encircle the second heat sink 112*b* installed at the second drive circuit 110*b* and may guide air, output from the second air blowing fan 118*b*, to the second heat sink 112*b*. The third air guide 120*c* may be disposed to encircle the third heat sink 112*c* installed at the third drive circuit 110*c* and may guide air, output from the third air blowing fan 118*c*, to the third heat sink 112*c*.

The induction heating device 100 according to an embodiment has configurations and features described above. Hereinafter, filter circuit 116*a*, 116*b*, 116*c* according to an embodiment will be described.

Figure 7:
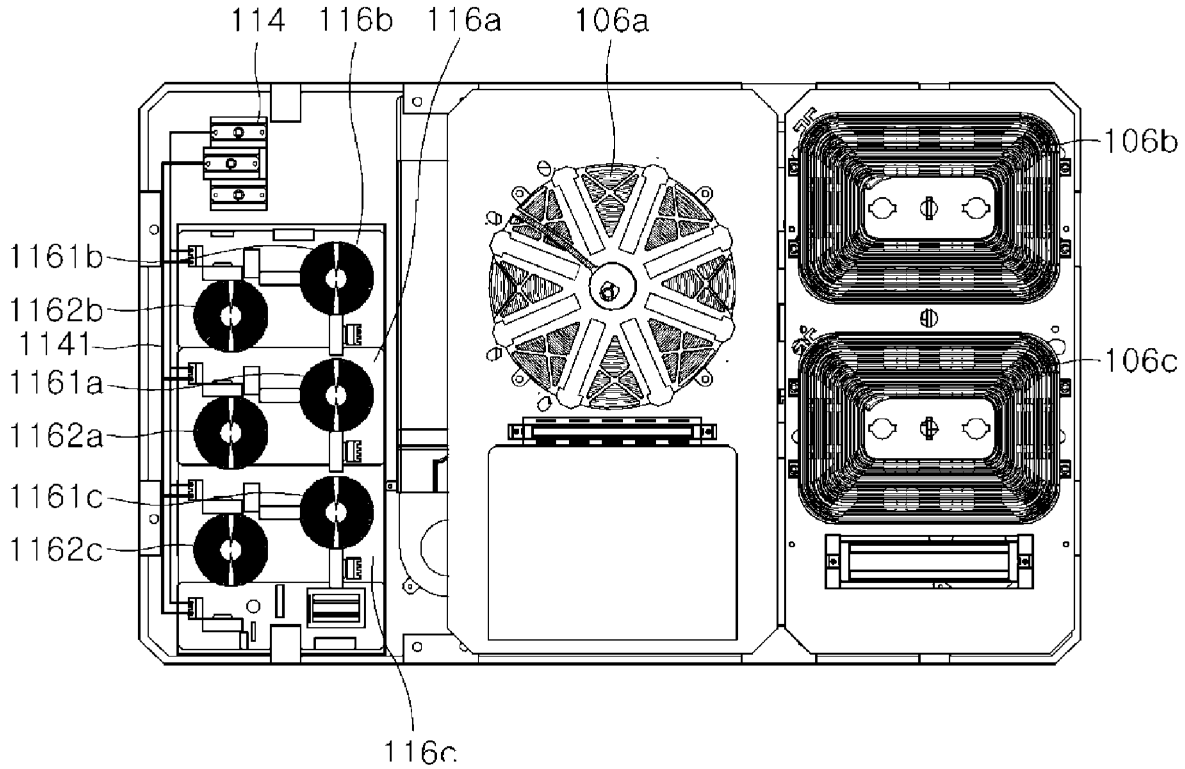
FIG. 7 is a plane view of an induction heating device according to an embodiment.

FIG. 7 is a plane view of an induction heating device 100 according to an embodiment.

In FIG. 7, the fourth working coil 106*d*, the fifth working coil 106*e*, the third light source unit 1043*c*, and the third base plate 108*c*, illustrated in FIG. 2, are omitted, for convenience of description. The one or more filter circuit 116*a*, 116*b*, 116*c* may be disposed at any one of the edges of the lower end of the case 102.

For example, the one or more filter circuit 116*a*, 116*b*, 116*c* may be disposed at a left (first) edge of the lower end of the case 102 referring to FIGS. 5, 6 and 7; however, embodiments are not limited thereto. The one or more filter circuit 116*a*, 116*b*, 116*c* may also be disposed at a right (second) edge of the lower end of the case 102. That is, the one or more filter circuit 116*a*, 116*b*, 116*c* may be disposed below any one of the left and right sides of the one or more base plate 108*a*, 108*b*, 108*c*.

Being below any one of the left and right sides may correspond to being below the second and third working coils 106*b*, 106*c* or the fourth and fifth working coils 106*d*, low-power working coils. In other words, the one or more filter circuit 116*a*, 116*b*, 116*c* may not be disposed below the high-power working coil, but rather, may be disposed below the low-power working coils. Referring to FIGS. 5 and 6, the one or more drive circuit 110*a*, 110*b*, 110*c* may be disposed below the first, second, and third working coils 106*a*, 106*b*, 106*c*.

In summary, the one or more filter circuit 116*a*, 116*b*, 116*c* may be disposed below at least one first low-power working coil, for example, the fourth and fifth working coils 106*d*, 106*e*, among a plurality of low-power working coils. Additionally, at least one drive circuit, for example, the third drive circuit 110*c*, of the one or more drive circuits 110*a*, 110*b*, 110*c*, may be disposed below the high-power working coil, for example, the first working coil 106*a*. At least one remaining drive circuit, for example, the second and third driving circuits 110*b*, 110*c*, among the one or more drive circuits 110*a*, 110*b*, 110*c*, may be disposed below at least one second low-power working coil, for example, the first and second working coils 106*a*, 106*b*, among the plurality of low-power working coils.

The one or more filter circuit 116*a*, 116*b*, 116*c*, as described above, may include the first filter circuit 116*a*, the second filter circuit 116*b*, and the third filter circuit 116*c*. That is, the first filter circuit 116*a*, the second filter circuit 116*b*, and the third filter circuit 116*c* may be disposed at a single point or position instead of being spaced and disposed at different positions. In this embodiment, the first filter circuit 116*a*, the second filter circuit 116*b*, and the third filter circuit 116*c* may be disposed in a single column.

In a case in which the one or more filter circuit 116*a*, 116*b*, 116*c* is disposed on the left side of the lower end of the case 102, the first filter circuit 116*a* may be disposed in or at a middle of the column, the second filter circuit 116*b* may be disposed on or at a top of the column, and the third filter circuit 116*c* may be disposed on or at a bottom of the column. In a case in which the filter circuit 116*a*, 116*b*, 116*c* is disposed on the right side of the lower end of the case 102, the first filter circuit 116*a* may be disposed in or at the middle of the column, the second filter circuit 116*b* may be disposed on or at the bottom of the column, and the third filter circuit 116*c* may be disposed on or at the top of the column.

The first filter circuit 116*a* may reduce noise made by the first working coil 106*a* in the central portion of the case 102. That is, the first filter circuit 116*a* may reduce noise of the first working coil 106*a*, which is a high-power working coil, disposed on the first base plate 108*a*.

The first filter circuit 116*a* may include a first filter core 1161*a* and a second filter core 1162*a*. The first filter core 1161*a* and the second filter core 1162*a* may perform noise filtering. The second filter circuit 116*b* may reduce noise made by the second working coil 106*b* and the third working coil 106*c* on the right side of the first working coil 106*a*. That is, the second filter circuit 116*b* may reduce the noise of the second working coil 106*b* and the third working coil 106*c*, which are low-power working coils, disposed on the second base plate 108*b* in the forward-backward direction.

The second filter circuit 116*b* may include a third filter core 1161*b* and a fourth filter core 1162*b*. The third filter core 1161*b* and the fourth filter core 1162*b* may perform noise filtering. The third filter circuit 116*c* may reduce noise made by the fourth working coil 106*d* and the fifth working coil 106*e* disposed on the left side of the first working coil 106*a*. That is, the third filter circuit 116*c* may reduce the noise of the fourth working coil 106*d* and the fifth working coil 106*e*, which are low-power working coils, disposed on the third base plate 108*c* in the forward-backward direction.

The third filter circuit 116*c* may include a fifth filter core 1161*c* and a sixth filter core 1162*c*. The fifth filter core 1161*c* and the sixth filter core 1162*c* may perform noise filtering.

The power feeder 114 may be a terminal block configured to supply external power from an external power source to the induction heating device 100. The power feeder 114 may be disposed at an edge of the lower end of the case 102 where the filter circuit 116*a*, 116*b*, 116*c* is disposed, and may be disposed adjacent to the filter circuit 116*a*, 116*b*, 116*c*.

That is, when the power feeder 114 is disposed at the left edge of the lower end of the case 102, the one or more filter circuit 116*a*, 116*b*, 116*c* may be disposed at the left edge of the lower end of the case 102, and may be disposed adjacent to a lower side of the power feeder 114. When the power feeder 114 is disposed at the right edge of the lower end of the case 102, the one or more filter circuit 116*a*, 116*b*, 116*c* may be disposed at the right edge of the lower end of the case 102, and may be disposed adjacent to the lower side of the power feeder 114.

The power feeder 114 may be electrically connected to the filter circuit 116*a*, 116*b*, 116*c* through an electric wire 1141. The electric wire 1141 may be disposed between an outer circumferential surface of the case 102 and the filter circuit 116*a*, 116*b*, 116*c*.

That is, when the power feeder 114 and the one or more filter circuit 116*a*, 116*b*, 116*c* are disposed at the left edge of the lower end of the case 102, the electric wire 1141 may be disposed between an outer circumferential surface of a left (first) side of the case 102 and the one or more filter circuit 116*a*, 116*b*, 116*c*. When the power feeder 114 and the one or more filter circuit 116*a*, 116*b*, 116*c* are disposed at the right edge of the lower end of the case 102, the electric wire 1141 may be disposed between an outer circumferential surface of a right (second) side of the case 102 and the one or more filter circuit 116*a*, 116*b*, 116*c*.

The one or more filter circuit 116*a*, 116*b*, 116*c* may be disposed adjacent to the one or more air blowing fan 118*a*, 118*b*, 118*c*. In this case, air output from the one or more air blowing fan 118*a*, 118*b*, 118*c* may be supplied to the one or more filter circuit 116*a*, 116*b*, 116*c*. Accordingly, a temperature of the one or more filter circuit 116*a*, 116*b*, 116*c* may decrease, and performance of the one or more filter circuit 116*a*, 116*b*, 116*c* may increase.

Figure 8A:
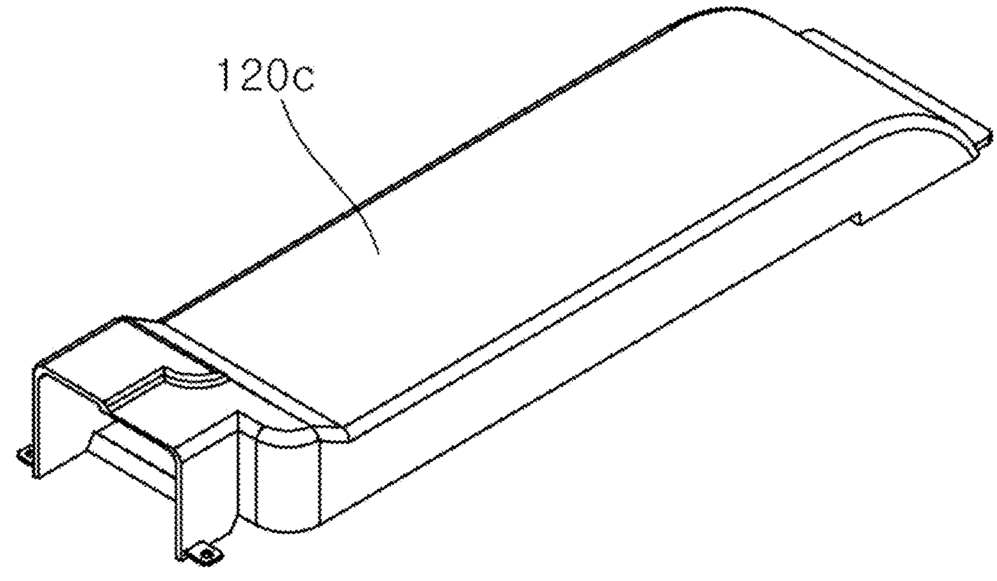
FIGS. 8A and 8B are views for explaining a concept in which air output from an air blowing fan is supplied to a filter circuit, according to an embodiment.
Figure 8B:
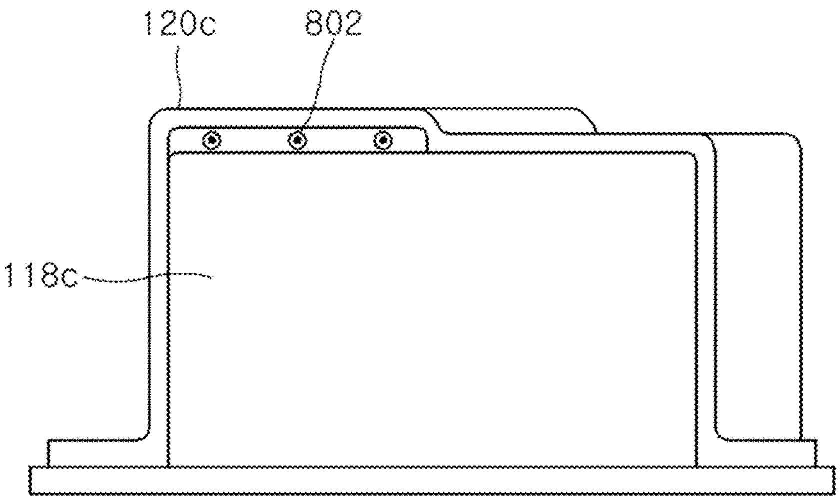

FIGS. 8A and 8B are views for explaining a concept in which air output from one or more air blowing fan 118*a*, 118*b*, 118*c* is supplied to one or more filter circuit 116*a*, 116*b*, 116*c*. For convenience of description, the concept of supplying air is described under the assumption that the one or more filter circuit 116*a*, 116*b*, 116*c* is disposed on or at a left (first) side of third air guide 120*c*. FIG. 8A is a perspective view showing third air guide 120*c*, and FIG. 8B is a cross-sectional view showing a portion where third air guide 120*c* and third air blowing fan 118*c* are connected.

Referring to FIGS. 8A and 8B, one (first) end of the third air guide 120*c* may be connected to an output end of the third air blowing fan 118*c*, and air output from the third air blowing fan 118*c* may flow through the third air guide 120*c*. In this case, a height of the one end of the third air guide 120*c* may be greater than a height of the third air blowing fan 118*c*. Some of air 802 generated by the third air blowing fan 118*c* may escape out of the third air guide 120*c*, due to hitting of the air output from the third air blowing fan 118*c* against the third heat sink 112*c*, or due to an inner air pressure between the one end of the third air guide 120*c* and the third air blowing fan 118*c*. Accordingly, some of the air 802 may cool the filter circuit 116*a*, 116*b*, 116*c*. The third air guide 120*c* may also have filter air channels for directly cooling the filter circuits 116*a*, 116*b*, 116*c*. That is, the air may be branched on or in the third air guide 120*c* and guided into the filter air channels to provide cool air to the filter circuits 116*a*, 116*b*, 116*c*.

With reference to the above description, a position at which the filter circuit 116*a*, 116*b*, 116*c* is disposed, is described hereinafter.

When a distance between the one or more filter circuit 116*a*, 116*b*, 116*c* and the one or more working coil 106*a*, 106*b*, 106*c*, 106*d*, 106*e* decreases, performance of noise filtering becomes inferior. That is, when the one or more filter circuit 116*a*, 116*b*, 116*c* is disposed close to the one or more working coil 106*a*, 106*b*, 106*c*, 106*d*, 106*e*, a temperature of the one or more filter circuit 116*a*, 116*b*, 116*c* may increase, and as the one or more filter circuit 116*a*, 116*b*, 116*c* is exposed to a high-intensity magnetic field, performance of noise filtering may deteriorate.

To improve the performance of noise filtering, the one or more filter circuit 116*a*, 116*b*, 116*c* needs to be spaced as far from the one or more working coil 106*a*, 106*b*, 106*c*, 106*d*, 106*e* as possible. That is, according to embodiments disclosed herein, the one or more filter circuit 116*a*, 116*b*, 116*c* may be disposed such that the one or more filter circuit 116*a*, 116*b*, 116*c* is spaced a maximum distance apart from the one or more working coil 106*a*, 106*b*, 106*c*, 106*d*, 106*e*.

More particularly, the first working coil 106*a* in the central portion of the case 102 may generate a highest level of noise because the first working coil 106*a* is a high-power working coil. According to embodiments disclosed herein, the first filter circuit 116*a* may be disposed such that the first filter circuit 116*a* is spaced a maximum distance apart from the first working coil 106*a* in the central portion. That is, the first filter circuit 116*a* may be disposed at an edge area of the case 102. Additionally, the second filter circuit 116*b* and the third filter circuit 116*c*, as described above, may be disposed far away from the second and fifth working coils 106*b*, 106*c*, 106*d*, 106*e*.

In summary, the one or more filter circuits 116*a*, 116*b*, 116*c* may disposed at a single location. Additionally, the one or more filter circuits 116*a*, 116*b*, 116*c* may be disposed below the second and third working coils 106*b*, 106*c*, which are low-power working coils, or below the fourth and fifth working coils 106*d*, 106*e*, which are low-power working coils, and may not be disposed below the first working coil 106*a*, which is a high-power working coil. Accordingly, the one or more filter circuit 116*a*, 116*b*, 116*c* may be disposed such that the one or more filter circuit 116*a*, 116*b*, 116*c* is spaced a maximum distance apart from the one or more working coil 106*a*, 106*b*, 106*c*, 106*d*, 106*e*, and electromagnetic compatibility may be optimized and noise filtering maximized.

Additionally, when a distance between the power feeder 114 and the one or more filter circuit 116*a*, 116*b*, 116*c* increase, noise may increase. Accordingly, the one or more filter circuit 116*a*, 116*b*, 116*c* may be disposed at a single point or location adjacent to the power feeder 114 to improve performance of noise filtering.

Further, the electric wire 1141 configured to connect the power feeder 114 and the filter circuit 116*a*, 116*b*, 116*c* may also be disposed at a farthest point away from the working coil 106*a*, 106*b*, 106*c*, 106*d*, 106*e* to minimize an effect of the magnetic field. Furthermore, as the temperature of the filter circuit 116*a*, 116*b*, 116*c* decreases, the performance of noise filtering improves. Accordingly, the filter circuit 116*a*, 116*b*, 116*c* may be disposed at a location where air output from the air blowing fan 118*a*, 118*b*, 118*c* is supplied.

In summary, according to embodiments disclosed herein, noise caused by a magnetic field generated in a working coil may be reduced efficiently, electromagnetic compatibility may be optimized, and a filter may be disposed at an optimal position of the electric range.

Embodiments disclosed herein are directed to an electric range that may efficiently reduce noise caused by a magnetic field generated in a working coil. Embodiments disclosed herein are also directed to an electric range that may optimize electromagnetic compatibility. Additionally, embodiments disclosed herein are directed to an electric range in which a filter circuit may be disposed in an optimal position.

Advantages are not limited to the above ones, and other advantages not mentioned above may be clearly understood from the description and may be more clearly understood from embodiments set forth herein.

Embodiments disclosed herein provide an electric range that may include a case, a cover plate coupled to an upper end of the case, and configured to receive an object to be heated on an upper surface thereof; at least two working coils disposed below the cover plate, and configured to heat the object to be heated; a base plate disposed at a middle of the case, and provided with the plurality of working coils in an upper portion thereof; one or more drive circuits disposed at a lower end of the case, and configured to drive the working coils; and a filter circuit disposed at the lower end of the case, and configured to reduce noise generated by the plurality of working coils. The one or more working coils may include a high-power working coil and at least one first low-power working coil.

The filter circuit may be outside or not overlapped or spaced apart from the high-power working coil, and the filter circuit may be disposed below the at least one first low-power working coil. The at least one drive circuit may be disposed below the high-power working coil.

The plurality of working coils may further include at least one second low-power working coil. At least one remaining drive circuit among the plurality of driving circuits may be disposed below the at least of second low-power working coil.

The electric range may further include a power feeder. The power feeder may be disposed adjacent to the filter circuit at the lower end of the case. The power feeder may be connected with an external power source. An electric wire may be electrically connected the power feeder and the filter circuit.

At least one first low-power working coil and the filter circuit may be disposed at any one of edges of the lower end of the case. The electric wire may be disposed between the any one of edges of the lower end of the case and the filter circuit.

By having the power feeder and the filter unit at one side of the electric range the distance to the high power coil may be maximized and the power feeder is close to the filter unit, so the connection wire may be also short and may be placed at a maximum distance to the high power coil. Thus, the possibility to receive a high power magnetic field is decreased and thereby the influence in the power supply to the filter unit is also not effected to keep the influence of the high power coil on the filter and its power supply as low as possible.

The plurality of working coils may include a first working coil in or at a central portion of the base plate, and at least one second third working coil on or at a right (first) and/or left (second) side of the first working coil. The first working coil may be the high-power working coil. The second and third working coils or the fourth and fifth working coils may correspond to the at least one low-power working coil and may be located at the left and/r right side of the first working coil being provided at the central portion the electric range. The filter circuit may be disposed below any one of left and right sides of the low-power working coil.

The plurality of drive circuits may be disposed on the other of the left and right sides of the case and below the base plate and below the central portion of the base plate. The filter circuit may include a first filter circuit configured to reduce noise generated by the first working coil, a second filter circuit configured to reduce noise generated by the second and third working coils, and a third filter circuit configured to reduce noise generated by the fourth and fifth working coils. Thus, there is one filter unit for the high power working coil. Further, there may be one filter unit for two low poser working coils.

The first, second and third filter circuits may disposed in a single column at any one of the sides. The first filter circuit may be disposed in or at a middle of the column. The filter circuit may be disposed on or at the left side of the base plate. The second filter circuit may be disposed on or at a top of the column. The third filter circuit may be disposed on a bottom of the column.

Alternatively, the filter circuit may be disposed on the right side of the base plate. The second filter circuit may be disposed on the bottom of the column. The third filter circuit may be disposed on the top of the column.

The first filter circuit may include first and second filter cores. The second filter circuit may include third and fourth filter cores. The third filter circuit may include fifth and sixth filter cores.

The electric range may further include at least one an air blowing fan configured to cool an inside of the case. The at least one air blowing fan may be disposed adjacent to the filter circuit. Air generated by the one or more air blowing fans may be supplied to the one or more filter circuits.

Embodiments disclosed herein provide an electric range that may include a case, a plurality of working coils disposed at an upper end of the case, and configured to heat an object to be heated, a filter circuit disposed at any one of edges of a lower end of the case and configured to reduce noise generated by the plurality of working coils, a power feeder disposed adjacent to the filter circuit at any one of the edges of a lower end of the case and connected with an external power source; and an electric wire configured to electrically connect the power feeder and the filter circuit. The electric wire may be disposed between the any one of edges of the lower end of the case and the filter circuit.

One or more filter circuits may be disposed at an edge of a lower end of a case, thereby reducing noise generated by a working coil as much as possible. The filter circuit may be spaced a maximum distance apart from a plurality of working coils, thereby improving performance of the filter circuit.

The electric range may be provided with the plurality of working coils including a high-power working coil and at least one low-power working coil. The filter circuit may be disposed below the low-power working coil, thereby effectively reducing noise generated mainly by the high-power working coil. The filter circuit may be disposed adjacent to a power feeder configured to be supplied with an external power from an external power source, thereby improving performance of noise filtering.

In the electric range according to embodiments disclosed herein, an electric wire, configured to electrically connect the power feeder and the filter circuit, may be disposed between an outer circumferential surface of the case and the filter circuit, thereby minimizing an effect of noise generated by the plurality of working coils. The filter circuit may be disposed at a point where air output from an air blowing fan is supplied, thereby reducing a temperature of the filter circuit and improving performance of the filter circuit.

According to embodiments disclosed herein, noise caused by a magnetic field generated in any one of the working coils may be reduced effectively. Also, a filter circuit may be spaced a maximum distance apart from a working coil to optimize electromagnetic compatibility. Additionally, the filter circuit may be disposed at an optimal position of an electric range.

The embodiments are described above with reference to a number of illustrative embodiments thereof. However, the embodiments are not intended to limit the embodiments and drawings set forth herein, and numerous other modifications and embodiments can be devised by one skilled in the art without departing from the technical spirit of the disclosure. Further, effects and predictable effects based on configurations are to be included within the range of the disclosure though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electric range, comprising:

a case;

a cover plate coupled to an upper end of the case, and configured to receive an object to be heated on an upper surface thereof;

a plurality of working coils disposed below the cover plate, and configured to heat the object to be heated;

at least one base plate disposed at a middle of the case, and provided with the plurality of working coils at an upper portion thereof;

an air blowing fan configured to cool an inside of the case;

a plurality of drive circuits disposed at a lower end of the case, and configured to drive each of the plurality of working coils;

a heat sink disposed over a portion of one of the plurality of drive circuits;

an air guide configured to guide air from the air blowing fan and disposed on the heat sink;

a plurality of filter circuits disposed at the lower end of the case, and configured to reduce noise generated by the plurality of working coils; and a power feeder disposed adjacent to the plurality of filter circuits at the lower end of the case, and configured to be supplied with power from an external power source, wherein the plurality of working coils includes a high-power working coil, at least one first low-power working coil, and at least one second low-power working coil disposed side by side with each other, wherein the plurality of filter circuits and the power feeder are disposed below the at least one first low-power working coil, wherein the plurality of drive circuits are disposed below the high-power working coil and the at least one second low-power working coil, wherein the air guide comprises a plurality of filter air channels to directly cool the plurality of filter circuits, wherein the plurality of filter circuits are disposed below any one of lateral sides of the at least one base plate, and wherein the plurality of drive circuits are disposed below the other of the lateral sides of the at least one base plate and below a central portion of the at least one base plate, wherein the plurality of filter circuits include a first filter circuit configured to reduce noise generated by the high-power working coil, a second filter circuit configured to reduce noise generated by the at least one first low-power working coil, and a third filter circuit configured to reduce noise generated by the at least one second low-power working coil, and wherein the first, second, and third filter circuits are disposed in a single column in a direction orthogonal to the direction in which the high-power working coil, the at least one first low-power working coil, and the at least one second low-power working coil are disposed.

2. The electric range of claim 1, further comprising:

an electric wire configured to electrically connect the power feeder and the plurality of filter circuits.

3. The electric range of claim 2, wherein the at least one first low-power working coil and the plurality of filter circuits are disposed adjacent at any one of edges of the case, and wherein the electric wire is disposed between the any one of the edges of the case and the plurality of filter circuits.

4. The electric range of claim 1, wherein the plurality of working coils includes a first working coil at the central portion of the at least one base plate, second and third working coils at a first lateral side of the first working coil, and fourth and fifth working coils at a second lateral side of the first working coil, and wherein the first working coil corresponds to the high-power working coil, the second and third working coils correspond to the at least one first low-power working coil, and the fourth and fifth working coils correspond to the at least one second low-power working coil.

5. The electric range of claim 1, wherein the first filter circuit is disposed at a middle of the column, based on the plurality of filter circuits disposed below the any one of the lateral sides of the at least one base plate, the second filter circuit is disposed at a top of the column, and the third filter circuit is disposed at a bottom of the column.

6. The electric range of claim 1, wherein the first filter circuit includes first and second filter cores, wherein the second filter circuit includes third and fourth filter cores, and wherein the third filter circuit includes fifth and sixth filter cores.

* * * * *